G. A. WEBER.
NONPUNCTURABLE TIRE.
APPLICATION FILED FEB. 21, 1919.
1,423,976.
Patented July 25, 1922.
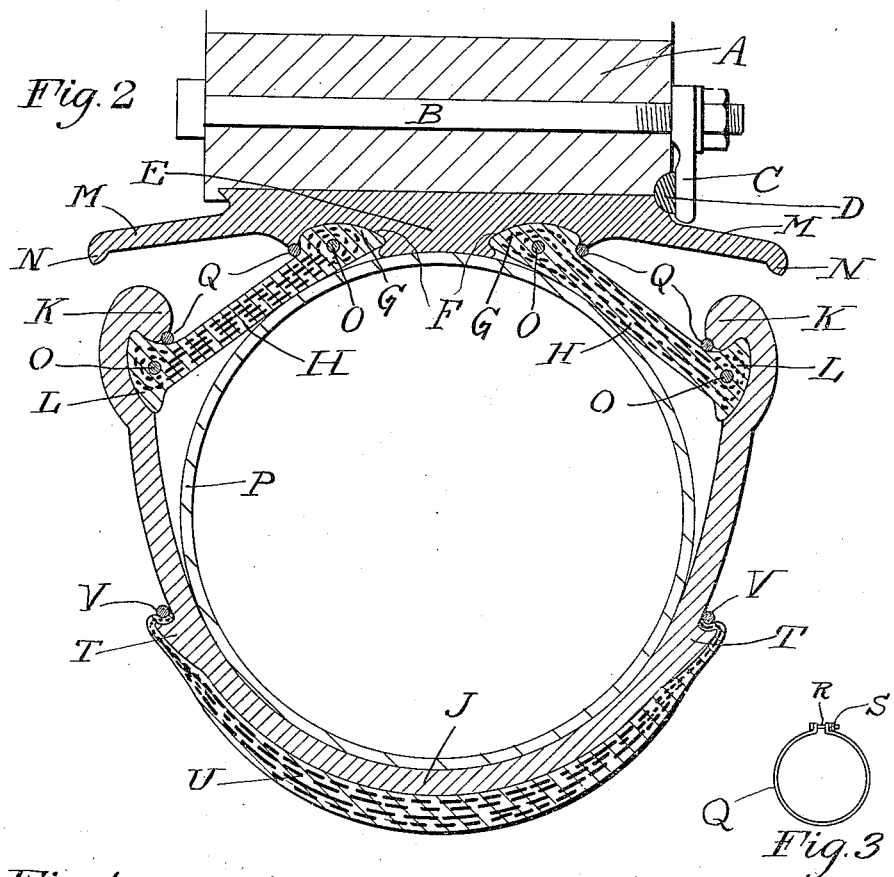
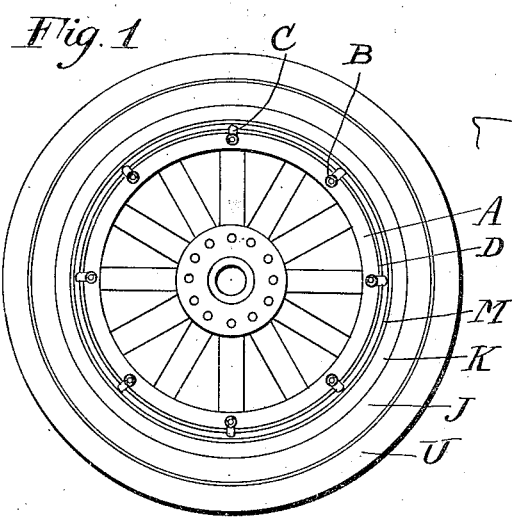
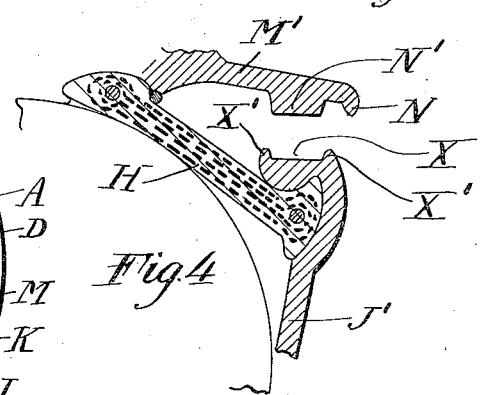
INVENTOR
George A. Weber
BY
Herbert G. Ogden
ATTORNEY

UNITED STATES PATENT OFFICE.

GEORGE A. WEBER, OF STAMFORD, CONNECTICUT.

NONPUNCTURABLE TIRE.

1,423,976.     Specification of Letters Patent.     Patented July 25, 1922.

Application filed February 21, 1919. Serial No. 278,384.

*To all whom it may concern:*

Be it known that I, GEORGE A. WEBER, a citizen of the United States, and a resident of Stamford, Fairfield County, State of Connecticut, have invented certain new and useful Improvements in Nonpuncturable Tires, of which the following is a specification, accompanied by drawings.

My invention relates to tires, but more especially to non-puncturable tires of the armored type for motor vehicles, and the primary objects of my invention are to improve upon such tires by simplifying their construction, reducing their cost, and rendering tires of this type practicable and efficient in use.

Objections to armored tires ordinarily reside in the fact that when provided with a tread in the form of a metal casing, usually in sections, mud, dirt or snow enters between the tire and the rim, and especially in freezing weather, interferes with the operation of the tire. Furthermore, the collapse or failure of the resilient elements of the tire to function, renders the tire useless and may cause the destruction of the tire and serious accidents.

In accordance with my invention I obviate these difficulties by providing means for effectually excluding mud, dirt, ice and snow and all foreign matter from entering the tire, and I also provide a novel construction by means of which the vehicle may be safely run on the metallic tire casings alone as tires, in the event that the inner resilient means or devices collapse or fail to function for any cause.

Further objects of the invention are to secure simple and efficient means for centering the outer metallic casing on the rim of the wheel, which centering means, in accordance with my improved construction, also preferably afford means for excluding foreign matter from the inside of the casing, and are at the same time resilient in order to more fully carry out my objects. It is also desirable to afford means for readily and quickly locking and unlocking the armored tire on the rim, and the tire as a unit should preferably be of the demountable rim type for convenience in mounting the tire in the felloe of the wheel.

The outer metallic casing forming the armor of the tire may enclose any suitable resilient medium or elastic body or bodies, or filling means. This filling means or material may conveniently take the form of air cushioning devices, as for instance the usual inner pneumatic tube, of which there may be one or more as desired, but I am not to be understood as limiting the invention to an armored pneumatic tire.

This armored tire is so constructed that the resilient parts are enclosed within the tire. The outside or armored part of the tire is attached to the demountable part of the rim, which may also carry the extension on which the casing would bear in case of the resilient interior parts of the tire giving way or collapsing from any cause. This attachment between the outside armored part and the demountable part consists of a flexible band.

Further objects of the invention will hereinafter appear and to all these ends the invention consists of the arrangement of parts and combinations of elements substantially as described and claimed in this specification and illustrated in one of its preferred forms in the accompanying drawings, in which—

Figure 1 is a side elevation of a wheel fitted with a tire constructed in accordance with my invention;

Figure 2 is an enlarged transverse cross-section of the tire,

Figure 3 is a detail view of one of the locking rings for the tire.

Figure 4 is a sectional detail view, broken away, of a modification.

Referring to the drawings, A represents the felloe of a wheel provided with the usual bolts B, clamps C, and clamping ring D for securing a demountable rim to the wheel.

In accordance with my invention, the rim E may have substantially the form and construction shown in cross-section in Figure 2, although I am not to be understood as limiting the construction to this form. The armored tire is adapted to be mounted upon and locked to the rim E, and in the preferred form shown, the rim is provided with undercut recesses F to receive and hold the inner enlarged edges G of the resilient centering and shielding elements H. The outer metallic casing J is also preferably provided with inturned edges K which form holding or locking recesses for the outer enlarged edges L of the shields H. The rim E, as shown in this instance, is furthermore provided with the guard rails M having the flanges N for the purpose to be specified.

These guard rails M may be omitted if desired.

The metallic casing J may be of steel and the function of the resilient elements or members H is to exclude dirt and foreign matter from the casing and also to act as centering supports for keeping the casing J centrally on the rim.

It is to be noted that the sides of the casing J are extended inwardly so that the lateral exposure of the resilient elements H is a practical minimum. Hence the latter are protected from injuries such as stone bruises and the like. The casing J overlaps or envelops laterally the elements H so that such protection is afforded regardless of whether the resilient medium, such as a pneumatic tube for example, within the casing is operative or not. It will be further noted that by such a formation of the metallic casing J the section exposed to the roadbed is largely armored, on the immediate tread as well as laterally, thus giving maximum protection to all resilient parts of the tire. The members H may be constructed of any suitable resilient material, as metal, or preferably layers of woven webbing cemented together and reinforced at the ends by means of the circumferentially extending metallic rings O. This provides a stiff and strong construction having the required resiliency and great wearing power. In Figure 2 I have shown an inner pneumatic tube P for convenience of illustration, but I am not limited to any particular method of obtaining resiliency in the tube. There may be any desired number of types used and one of the important features of my invention resides in the fact that the guard rails M on the rim E form bearing portions in which the edges K of the casing J will bear in case the pneumatic tube P should collapse. The shielding and centering members H will permit the casing J to bear upon the rails M in case of the collapse of the inner tube or other inner resilient means or bodies, and the flanges N will prevent the casing J from slipping off the guard rail.

Any suitable means may be provided for locking the centering shields H to the rim and casing respectively, and this locking means may conveniently take the form of split locking rings Q as shown in Figure 3, having bolts R and nuts S for tightening purposes.

In securing the casing to the rim E, the outer edges L of the members H are first locked to the casing by means of the locking rings Q, and then the edges G of the members H are similarly locked in the recesses F in the rim E by means of the rings Q and by the use of any suitable tool which may be thrust between the casing and the guard rails M and is capable of tightening up the nuts S.

The casing J is preferably provided with a recessed flange T adapted to receive and hold the edges of a shoe U of suitable material. Expansible clamping rings V or other suitable means may be provided for clamping the edges of the shoe U.

It will be observed that the casing J and the centering shields H together form a chamber for the inner tube P or other resilient medium or cushioning bodies. It will be noted also that this chamber may be made to have a practically unbroken cross-section substantially free from undesirable angles, thus well adapting it for efficient use of the inner tube or other cushioning medium. This chamber may also be made air-tight and pumped up with air, thus dispensing with the inner tube or other resilient devices.

The larger bearing surface for the inner tube or other resilient medium or bodies in the chamber is preferably formed by the rim E and the shields H, as shown in Figure 2, for by such construction the strains are better distributed.

Figure 4 shows a modification or alternative construction in which the rim E is provided with guard rails M' having bearing projecting surfaces N' adapted to bear in grooves X in the edges X' of the casing J'. By this means the grooves X guide and center the casing J' on the guard rails M'.

I claim and desire to obtain by Letters Patent the following:

1. A tire having an outer metallic casing capable of enclosing a resilient medium, a rim having bearing portions adapted to cooperate with the substantially continuous inner edges of the casing if the resilient body should give way and permit contact between said bearing portions and edges, and resilient means for connecting the casing to the rim.

2. A tire having an outer metallic casing, a rim, annular members of resilient material at each side of the rim closing the space within the casing and forming a chamber, said metallic casing having its sides extended inwardly to substantially envelop laterally said annular members, means for locking the said resilient members to the rim, and means for interlocking said casing and said annular members.

3. A tire having a rim provided with laterally projecting portions forming guard rails, a metallic casing adapted to receive a resilient medium, and annular shields of resilient material connecting the casing to the rim, whereby the guard rails form bearing portions for the edges of the casing if the inner resilient medium give way and permit the casing to contact with the guard rails.

4. In a device of the class described, in combination, a metallic casing adapted to receive a resilient medium, a rim, and resilient means for locking said casing to said rim, said casing adapted to overlap laterally said resilient means to protect the latter from exposure.

5. In a device of the class described, in combination, a metallic casing adapted to receive a resilient medium, a rim, and resilient means for centering said casing on said rim, said casing adapted to overlap laterally said resilient means to give the latter a minimum exposure.

6. In a device of the class described, in combination, a rim provided with outwardly extending guard rails, a metallic casing adapted to receive a resilient medium and provided with inner edges to cooperate with said guard rails if the resilient medium should fail, and resilient means for centering said casing on said rim, said casing having its sides extended inwardly to protect said resilient means.

7. In a device of the class described, in combination, a rim provided with outwardly extending guard rails having flanges, a metallic casing adapted to receive a resilient medium and having its sides extended inwardly to provide edges adapted to cooperate with said guard rails and to be guided by said flanges if the resilient medium should give way, and resilient means for centering the casing on said rim, said means lying substantially within the extended sides of said casing.

8. In a device of the class described, in combination, a rim provided with outwardly extending guard rails, a metallic casing adapted to receive a resilient medium and having its sides extended inwardly to provide edges adapted to cooperate with said guard rails if the resilient medium should give way, and annular shields of resilient material connecting said casing to said rim, said shields being disposed substantially within the extended sides of said casing.

9. In a device of the class described, in combination, a rim provided with a pair of bearing surfaces, a metallic casing adapted to receive a resilient medium and provided with inner edges adapted to cooperate with the bearing surfaces of said rim if the resilient medium should fail, resilient means for centering said casing on said rim when said resilient medium is operative, and means associated with the bearing surfaces of said rim for assisting the resilient centering means when said medium fails.

10. In a device of the class described, in combination, a rim provided with a pair of guard rails, a metallic casing adapted to receive a resilient medium and provided with inner edges adapted to cooperate with said guard rails if the resilient medium should fail, annular shields of resilient material for centering the casing on said rim when the resilient medium is operative, and flanges associated with said guard rails for assisting said annular centering shields when said medium fails.

11. In a device of the class described, in combination, a rim, a metallic casing adapted to receive a resilient medium, and resilient means connecting said casing to said rim, said rim, casing and resilient means forming a substantially unbroken interior space for enclosing said resilient medium.

12. In a device of the class described, in combination, a rim, a metallic casing adapted to receive a resilient medium, and annular shields of resilient material for centering the casing on said rim, said rim, casing and annular shields forming a substantially unbroken interior chamber for enclosing said resilient medium.

In testimony whereof I have signed this specification in the presence of two subscribing witnesses.

GEORGE A. WEBER.

Witnesses:
C. J. HALL,
EDWIN E. ANDERSON.